(12) United States Patent
Andresen

(10) Patent No.: US 11,370,126 B2
(45) Date of Patent: Jun. 28, 2022

(54) METHOD FOR GRIPPING, MOVING AND RELEASING A PIECE OF CLOTH WITH A GRIPPER, AND A GRIPPER

(71) Applicant: Inwatec ApS, Odense SV (DK)

(72) Inventor: Mads Andresen, Odense SV (DK)

(73) Assignee: Inwatec APS, Odense SV (DK)

( * ) Notice: Subject to any disclaimer, the term of this patent is extended or adjusted under 35 U.S.C. 154(b) by 10 days.

(21) Appl. No.: 16/961,998

(22) PCT Filed: Dec. 20, 2018

(86) PCT No.: PCT/DK2018/050411
§ 371 (c)(1),
(2) Date: Jul. 14, 2020

(87) PCT Pub. No.: WO2019/137585
PCT Pub. Date: Jul. 18, 2019

(65) Prior Publication Data
US 2021/0078184 A1  Mar. 18, 2021

(30) Foreign Application Priority Data

Jan. 15, 2018 (DK) .......................... PA 2018 70026
Aug. 7, 2018 (DK) .......................... PA 2018 70517

(51) Int. Cl.
*B25J 15/00* (2006.01)
*B25J 9/10* (2006.01)
*B65H 5/14* (2006.01)

(52) U.S. Cl.
CPC ........... *B25J 15/0028* (2013.01); *B25J 9/102* (2013.01); *B25J 9/104* (2013.01); *B65H 5/14* (2013.01)

(58) Field of Classification Search
CPC ........ B25J 9/102; B25J 15/0028; B25J 9/104; B25J 15/00; B65H 1/04; B65H 3/00;
(Continued)

(56) References Cited

U.S. PATENT DOCUMENTS 3,776,584 A   12/1973  Van Gerven
4,578,013 A   3/1986   Barillec et al.
(Continued)

FOREIGN PATENT DOCUMENTS

EP   0 187 351 A1   7/1986
SU   1611822 A1     12/1990
(Continued)

OTHER PUBLICATIONS

International Search Report dated Mar. 22, 2019 from PCT/DK2018/050411 (8 pages).
(Continued)

*Primary Examiner* — Stephen A Vu
(74) *Attorney, Agent, or Firm* — Crowell & Moring LLP; John C. Freeman

(57) ABSTRACT

A method for gripping, moving and releasing a piece of cloth with a gripper that is initially placed with opposed, movable, coherent, flexible surface parts in contact with the piece of cloth, and the surface parts are moved with respect to each other and with respect to the gripper in a gripping action, in order to pinch and hold on to the piece of cloth. The gripper with the piece of cloth pinched between the surface parts is moved to a different location, wherein the surface parts move in a reverse direction in order to release the piece of cloth. While in contact with the piece of cloth, the opposed surface parts are moved along a path which brings the surface parts both closer to each other and moves them in a direction away from the piece of cloth.

4 Claims, 13 Drawing Sheets

(58) Field of Classification Search
CPC .... B65H 5/08; B65H 5/14; B65H 2404/2614; B65H 2404/2615; B65H 2701/174; B66C 1/48; A41H 43/02
See application file for complete search history.

(56) References Cited

U.S. PATENT DOCUMENTS

| | | | |
|---|---|---|---|
| 5,303,910 A | 4/1994 | McGill et al. | |
| 6,474,711 B2 | 11/2002 | Kazerooni et al. | |
| 6,554,337 B2 | 4/2003 | Kazerooni et al. | |
| 7,685,938 B2* | 3/2010 | Yee | B65H 3/02 101/477 |
| 8,967,688 B2* | 3/2015 | Wilson | E01H 1/1206 294/1.3 |
| 10,723,019 B2* | 7/2020 | Wagner | B25J 9/109 |
| 2002/0113448 A1* | 8/2002 | Kazerooni | B25J 15/00 294/86.4 |
| 2002/0125727 A1* | 9/2002 | Kazerooni | B66C 1/445 294/86.4 |
| 2015/0343631 A1* | 12/2015 | Martinez-Esponda | B25J 11/005 74/490.03 |

FOREIGN PATENT DOCUMENTS

| | | | |
|---|---|---|---|
| WO | WO 94/27900 A1 | 12/1994 | |
| WO | WO-9427900 A1 * | 12/1994 | B65H 3/22 |

OTHER PUBLICATIONS

Written Opinion of the International Searching Authority dated Mar. 22, 2019 from PCT/DK2018/050411 (10 pages).
International Preliminary Report on Patentability dated Jul. 21, 2020 from PCT/DK2018/050411 (11 pages).
Office Action dated May 23, 2018 from Danish Priority Application PA 2018 70026 (8 pages).
Extended European Search Report dated Nov. 29, 2021 from corresponding EP Application 18899397.6 (6 pages).

* cited by examiner

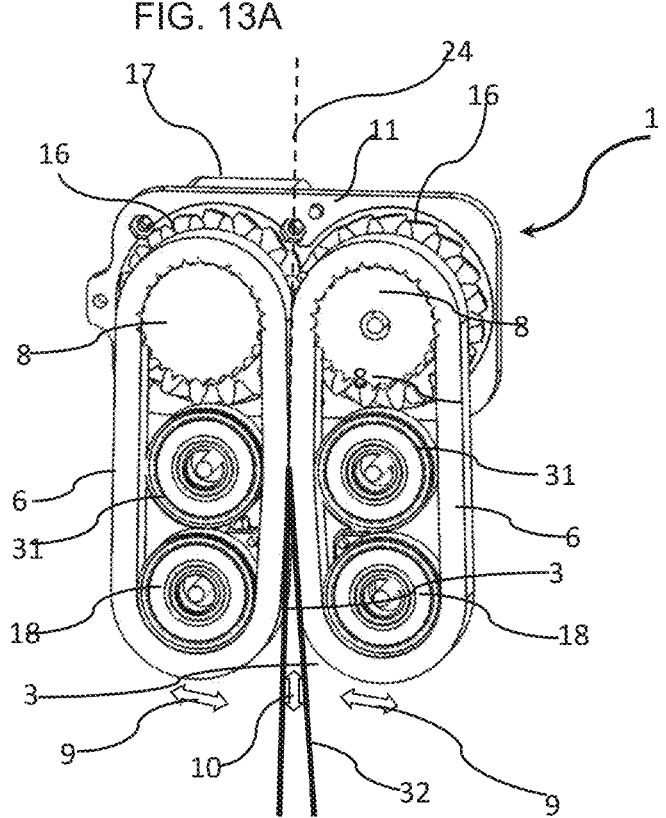
FIG. 13A
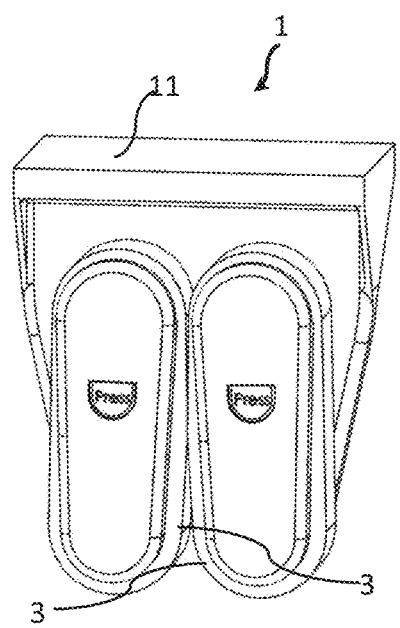
FIG. 13B
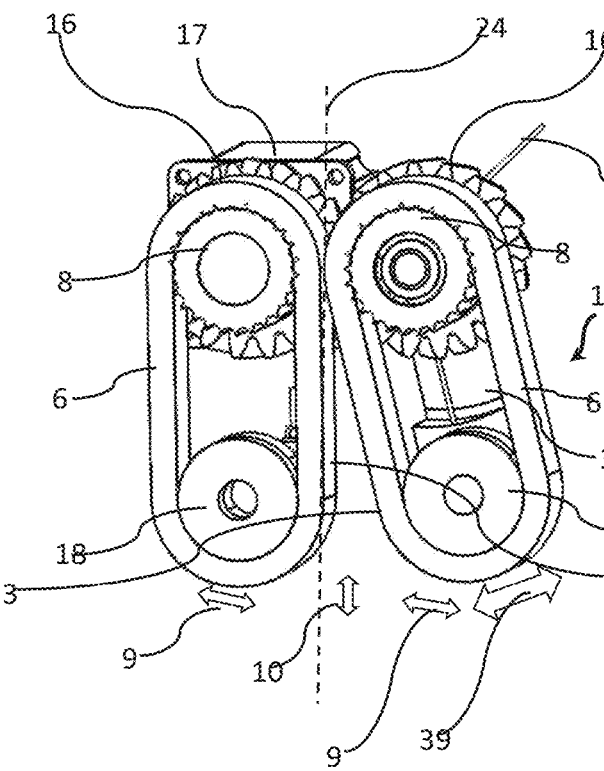
FIG. 14A
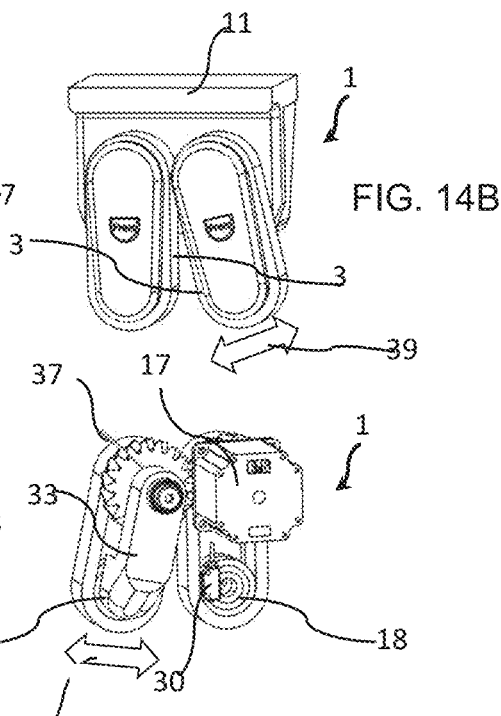
FIG. 14B
FIG. 14C

METHOD FOR GRIPPING, MOVING AND RELEASING A PIECE OF CLOTH WITH A GRIPPER, AND A GRIPPER

This application is a National Stage application of International Application No. PCT/DK2018/050411, filed Dec. 20, 2018, the entire contents of which are incorporated herein by reference.

This application claims priority under 35 U.S.C. § 119(a) to Danish Patent Application No. PA 2018 70026, filed on Jan. 15, 2018, and Danish Patent Application No. PA 2018 70517, filed on Aug. 7, 2018, the entire contents of each of which are incorporated herein by reference.

BACKGROUND OF THE INVENTION

Description of the Related Art

In prior art methods for gripping, moving and releasing a piece of cloth with a gripper are known, whereby the gripper initially is placed with opposed, movable coherent surface parts in contact with the piece of cloth. According to such known methods the surface parts are moved with respect to each other and with respect to the gripper in a gripping action, in order to pinch and hold on to the piece of cloth, and the gripper with the piece of cloth pinched between the surface parts is then moved to a different location, and here the surface parts are caused to move in a reverse direction in order to release the piece of cloth. The prior art methods are not well suited for gripping and holding on to an individual piece of cloth at a protruding area thereof, as the gripping action according to known methods pinches on a piece of cloth typically from two opposed sides which often leads to an insufficient grip between gripper and piece of cloth. Also, the foremost points in pinchers are prone to push away pieces of cloth during advance thereof into a pile of cloth which leads to failed grip action.

SUMMARY OF THE INVENTION

According to the present invention the opposed surface parts, while in contact with the piece of cloth for the gripping action, are moved along a path which brings the surface parts both closer to each other and moves them at least with respect to the gripper in a direction away from the piece of cloth to be gripped. As the surface parts are coherent, this movement advances further surface parts which also touch and hold on to the piece of cloth which is gripped. Thus, while moving an initially contacted protruding area of a piece of cloth, which is pinched between the surface parts, deeper into the gripper, new surface parts are advanced, due to the coherence of the active surface parts, into an active position and contribute to an enhancement of the pinch or grip on the piece of cloth.

It is preferred that the surface parts, when they have moved a predetermined distance with respect to the gripper, are restricted in movement away from each other and thereby causing a nipping action on the piece of cloth. This restriction of the surface parts ensures a particularly firm and secure grip.

When at least one of the surface parts is restricted to move along a circular path and/or is restricted in at least a part of its path by a guiding block or wheels which forms a part of the gripper it is ensured that the gripper can easily be made out of simple and well-known pieces, such as rollers, wheels or conveyer belt pieces and thus a simple and reliable gripper may be made.

The opposed movable coherent surface parts are preferably caused to move by having an underlying chain, band or wheel structure connected to a moving member, which moving member translates or rotates with respect to the gripper. In this way a distinction is made between the surface parts which are active and come into contact with the piece of cloth, and an underlying structure, which imparts movement to the surface parts. The underlying structure may be a wheel or other rotating body. It may alternatively include a chain or flexible belt such that pulling forces may be transferred from one part of the belt or chain to an adjacent part thereof such that the surface parts contacting the piece of cloth may be moved by a moving member which attacks a part of the chain which is distanced from the surface part actually contacting the cloth to be gripped.

The present invention also concerns a gripper adapted to grip, hold and release a piece of cloth. The gripper includes opposed, movable coherent and flexible surface parts, which by way of a robotic arm are adapted to be positioned in contact with the piece of cloth at a desired gripping point thereof. The movable coherent and flexible surface parts are adapted to be moved either by being rotated with respect to a center point and/or by being pulled over guiding members of the gripper. By way of the rotation or the pull over guiding members, it is ensured, that more active surface parts of the gripper come into contact with the piece of cloth, and the parts of the cloth initially contacted may be gripped or pinched harder. By being flexible is understood, that surface parts are capable of bending and/or giving way when being stressed, such that elements of cloth may be situated between two opposed surface parts in such a manner that at areas of the surface parts adjacent to the cloth, the surface parts will contact each other.

According to the present invention, the gripper comprises two opposed movable coherent surface parts. Thus, a well-defined gripping area is defined by the opposed movable parts.

According to the present invention the opposed surface parts are guided by opposed blocks and the surface parts include elongate, bendable members with rubbery exterior surfaces facing each other and/or the piece of cloth to be gripped. By arranging opposed block and allowing elongate bendable members with rubbery exterior surfaces to be guided by such blocks, a crevice is easily provided between the opposed blocks. And when the opposed surface parts are guided into such a crevice a nipping action will be performed between the opposed rubbery surfaces, such that any piece of cloth touching the surface parts will be drawn into the crevice and pinched the stronger the more the surfaces are pulled into the crevice.

The two opposed surface parts each have underlying chain, band or wheel members, which by way of rotation or translation are caused to move, which movement causes the surface parts to move. In this way the underlying chain, band or wheel members may be made very strong such as be being provided by steel, or fibrous materials. And at the same time the surface may be made highly flexible and even slightly sticky, such as by being made from a polyurethane compound or natural rubber.

The opposed blocks form a crevice such that the opposed surface parts are caused to move up and down in the crevice. This may aid in ensuring a secure hold on the piece of cloth, especially it is preferred that the crevice has a v-shaped entry, such that pressure on a piece of cloth pinched between the opposed surfaces may build up gradually.

The present invention also includes the use of the method for griping a piece of cloth, garment or other flexible individual piece in a laundry facility.

The present invention may be used to sort elements such as one or more of the following: Textiles, Garment, Towels, Sheets, Pillow cases, Bed sheets, Table cloth, Rags, Kitchen towel, Mops, Dust mats, Work wear, Gowns, Uniforms, Shirt, Socks, Private garment, Industrial workwear, Healthcare workwear, Food industry workwear, Infant textiles, Bibs, Blankets, Napkins, Wash glove and other flexibles in individual pieces. Whenever the term "cloth" is used in the following, one of the above or an element of similar nature is to be understood.

BRIEF DESCRIPTION OF THE DRAWINGS

FIG. 13A shows a modified embodiment in a 3D rendering, which is a frontal view without certain nonessential cover members, and FIG. 13B shows a frontal view of FIG. 13A with all members present, FIG. 14A discloses yet another embodiment in a 3D rendering, which is a frontal view without certain nonessential cover members, and FIG. 14B lefthand side top is the same frontal view of FIG. 14A with all members present, and FIG. 14C is a rear view of the gripper of FIG. 14A, and, FIG. 15 shows an exploded view of the embodiment disclosed in FIG. 14.

DETAILED DESCRIPTION OF THE EMBODIMENTS

Figure 9:
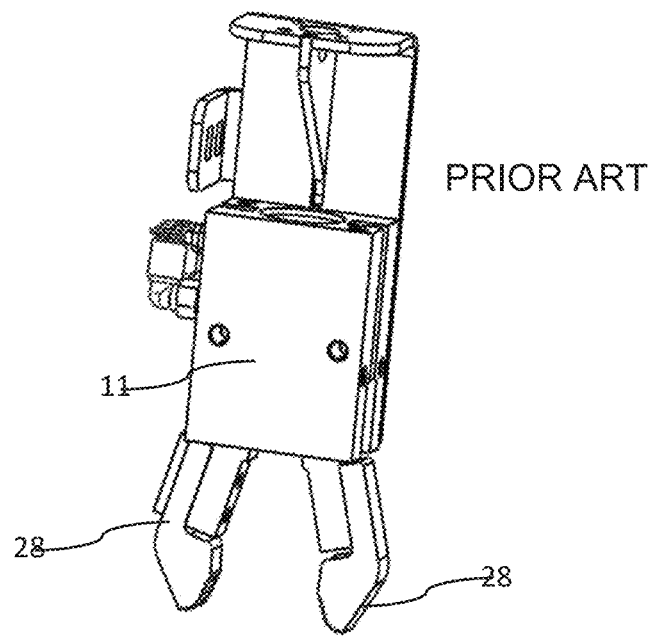
FIG. 9 discloses a prior art gripper.
Figure 9A:
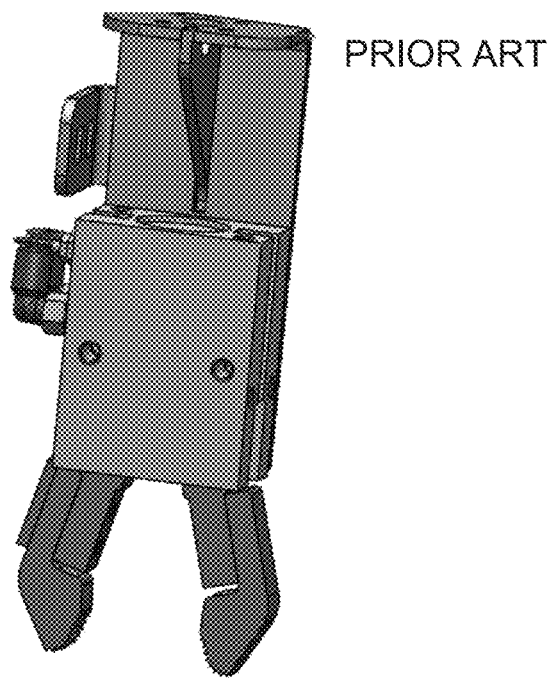
FIG. 9a is the gripper in FIG. 9 shown in computer graphic display mode.

The prior art gripper shown in FIG. 9 includes two opposed arms 28, which are linked to a common frame 11. An actuator (not visible) is enclosed in the frame 11, and is situated in order to pivot the two arms 28 towards and away from each other, in a pinch, plier or scissor like movement. The gripper is to be mounted on the end of a robotic arm or similar device, such that it may be placed with a piece of cloth between the two arms 28, where after the arms, are pivoted towards each other such that the piece of cloth may be gripped as the arms 28 pivot their ends towards each other. When the gripper is placed at the piece of cloth, one or both of the arms may disturb the cloth and push it further away, and also during pivotal movement of the arms, cloth may be pushed away from the gripper, causing the gripper to return empty from an attempted gripping operation.

Figure 1:
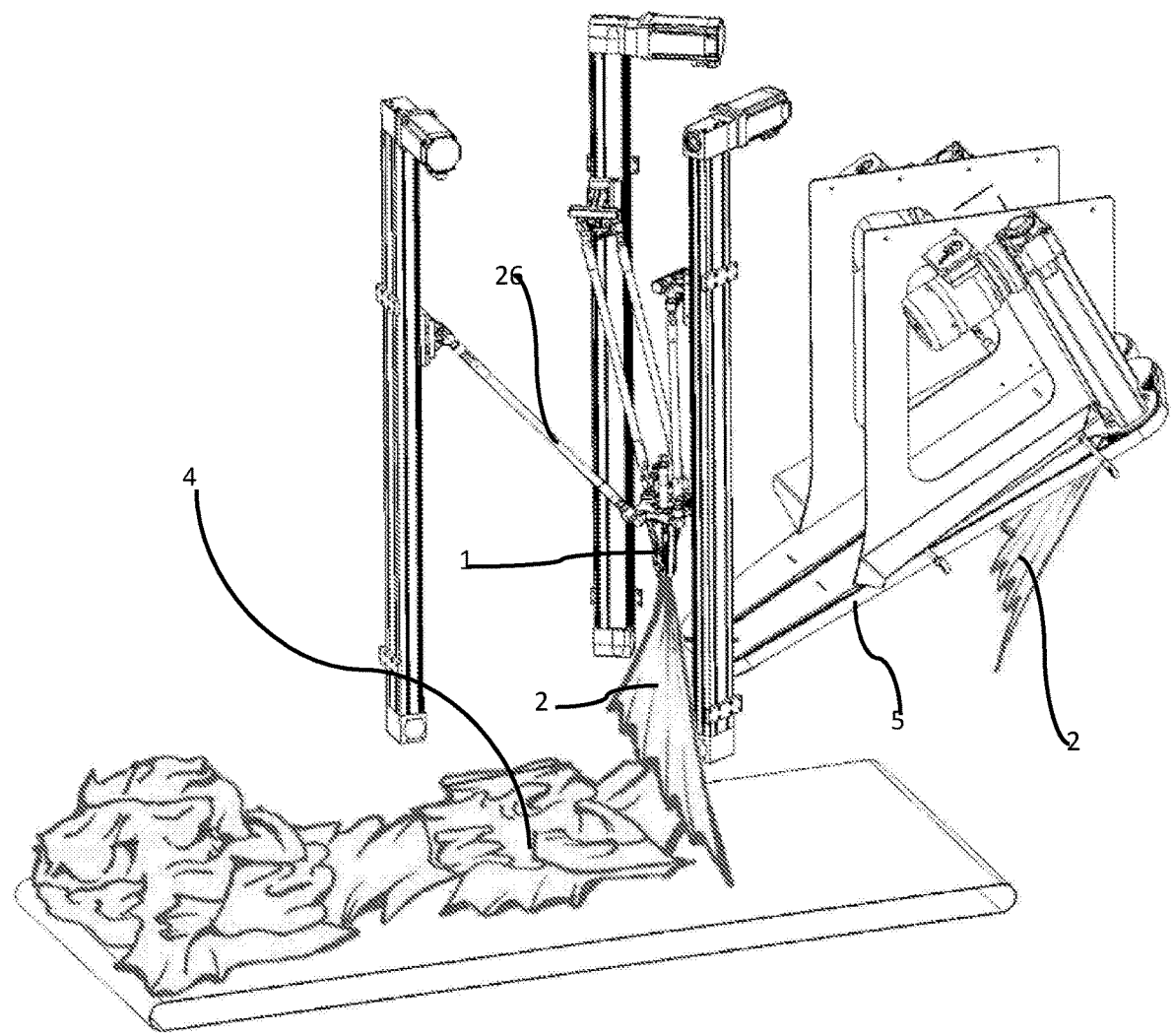
FIG. 1 shows the gripper in the environment in which it is intended to work.

A gripper according to the present invention is shown in FIG. 1 during a transfer action, whereby a piece of cloth 2 has been gripped and firmly pinched between opposed surface parts 3 and is now hanging down from the gripper 1. The piece of cloth 2 has been lifted out of a pile 4 of singular pieces of cloth, and is to be delivered to a conveyer mechanism 5, which will forward the piece of cloth to further treatment such as sorting. This arrangement is used in laundry treatment, such as at the dirty end where unsorted, not clean cloth arrives, and where a first action includes singling out individual pieces of cloth, such that they may be sorted according to wash requirements or other criteria. The shown gripper may be used in other parts of a laundry process such as when individualizing pieces of cloth out of a pile of washed or tumbled laundry elements. The gripper is suspended at the end of a robotic arm 26 of sorts, and in FIG. 1 a delta robot 26 is shown, which may move the gripper 1 around in 3-dimensional space according to directions provided by a computer (not shown). The computer may gain input from various scanners (not shown) or other sensors in order to determine a good point to try and grip an individual piece of garment, or the robotic arm may function with less guidance and attack the pile 4 at random and through trial and error eventually hold on to a piece of cloth and move it to the conveyer mechanism 5. Depending on agility, range and speed of the robotic arm 26, one, two or more spaced apart conveyer mechanisms may be provided, such that an initial sorting based on colour, weight or other property of the individual piece of cloth easily sensed by sensors build into the gripper 1, may be performed. It should be noted that the shown robotic arm is one example of such a device, and that the gripper may well function with other automated pick and place apparatus.

With reference to FIG. 1 it shall be noticed, that the gripping action and movements of the robotic arm 26 may be co-ordinated in a number of ways, such that movement of the surface parts 3 of the gripper to grip the piece of cloth 2 may take place while simultaneously moving the robotic arm in an opposite direction. While the surfaces 3, contacting the piece of cloth still in the pile 4, are moved in a direction away from the pile 4, the robotic arm forwards the entire gripper 1 at a similar speed or exact same speed towards the pile 4. It is even possible to move the robotic arm such, that the surfaces 3 are advanced into the pile 4 during gripping, or such that the surfaces are retracted away from an advanced position in the pile 4 according to whatever ensures the best grip and ensures that only a single piece of cloth 2 is adhered to the gripper 1. In FIG. 1 a robotic arm of the D or delta type is disclosed, where a number of arms 26 determine the orientation and position of a platform, which forms the basis for the gripper 1.

Figure 2:
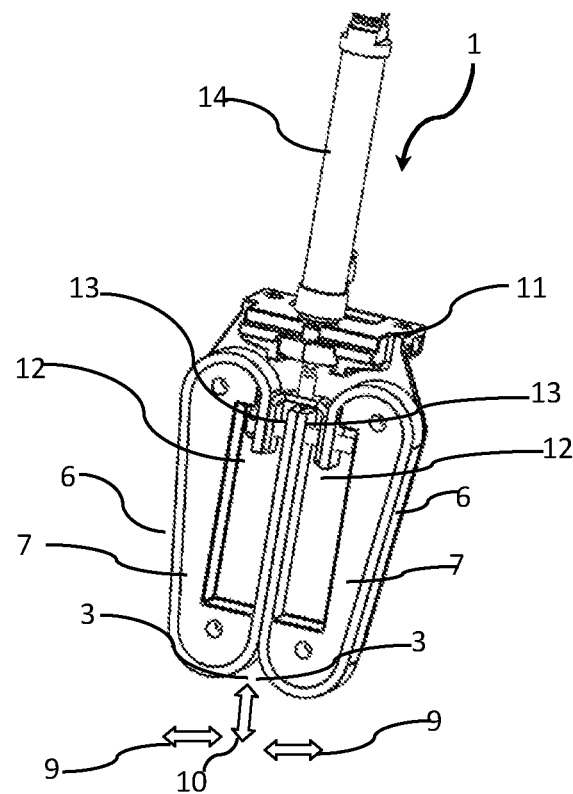
FIG. 2 is a 3d sectional view of an embodiment of the gripper.
Figure 2A:
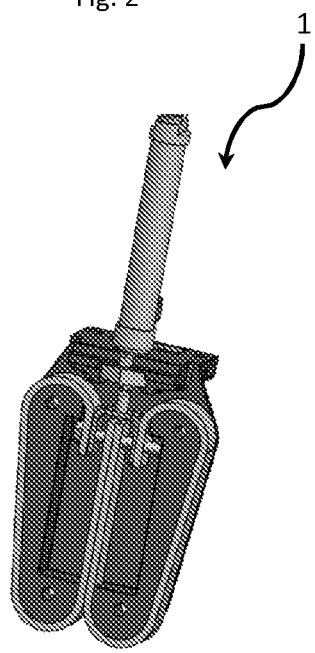
FIG. 2a is the embodiment of the gripper in FIG. 2 shown in computer graphic display mode.
Figure 3:
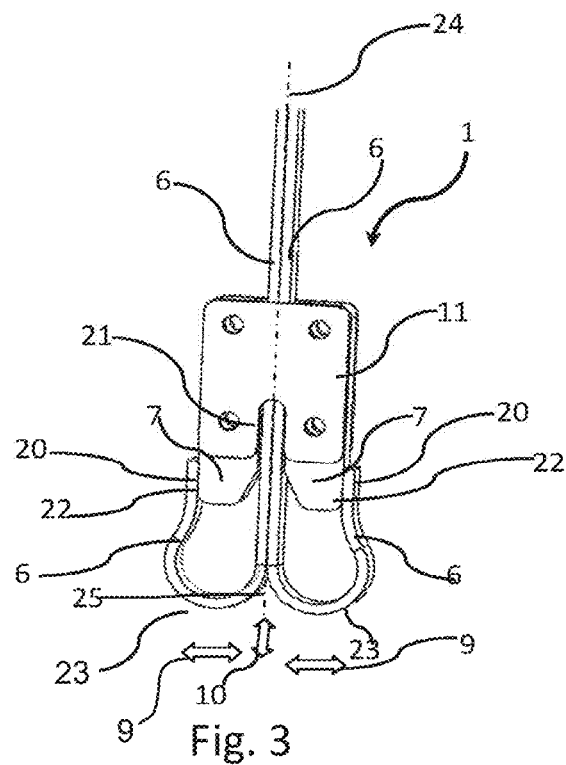
FIG. 3 is a schematic display in 3d view of another embodiment of the gripper.
Figure 3A:
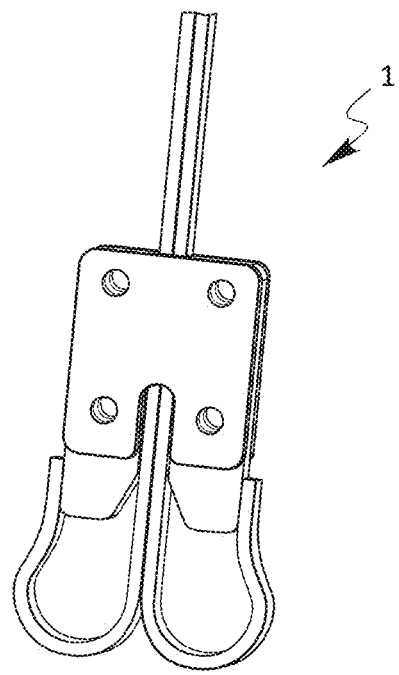
FIG. 3a is the gripper in FIG. 3 shown in computer graphic display mode.
Figure 4:
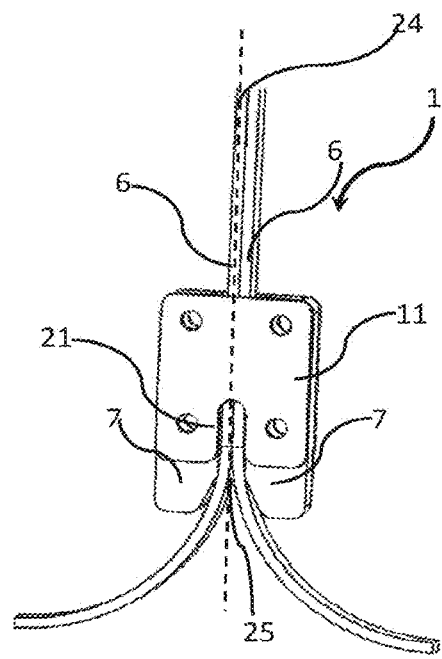
FIG. 4 is a schematic 3d view of an embodiment of the gripper.
Figure 4A:
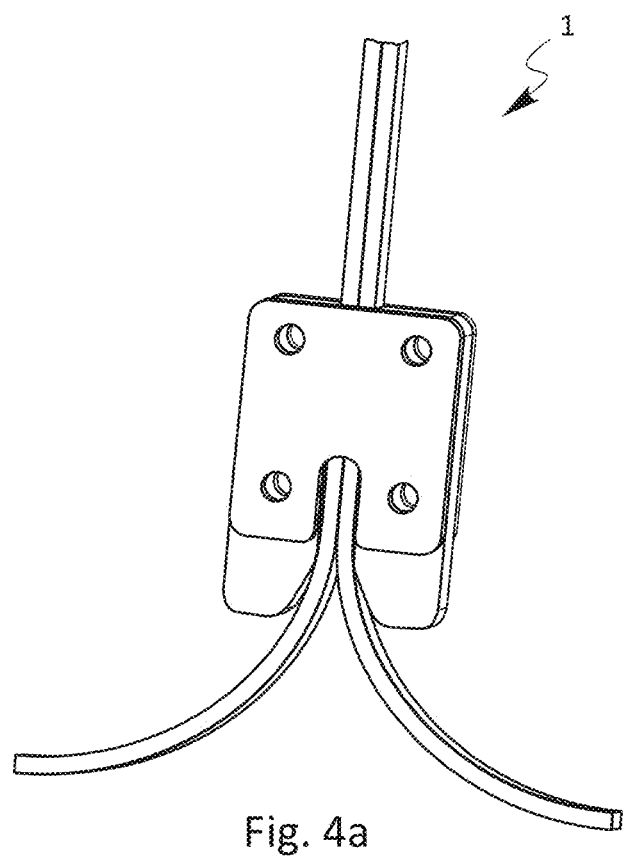
FIG. 4a is the gripper in FIG. 4 shown in computer graphic mode.
Figure 5:
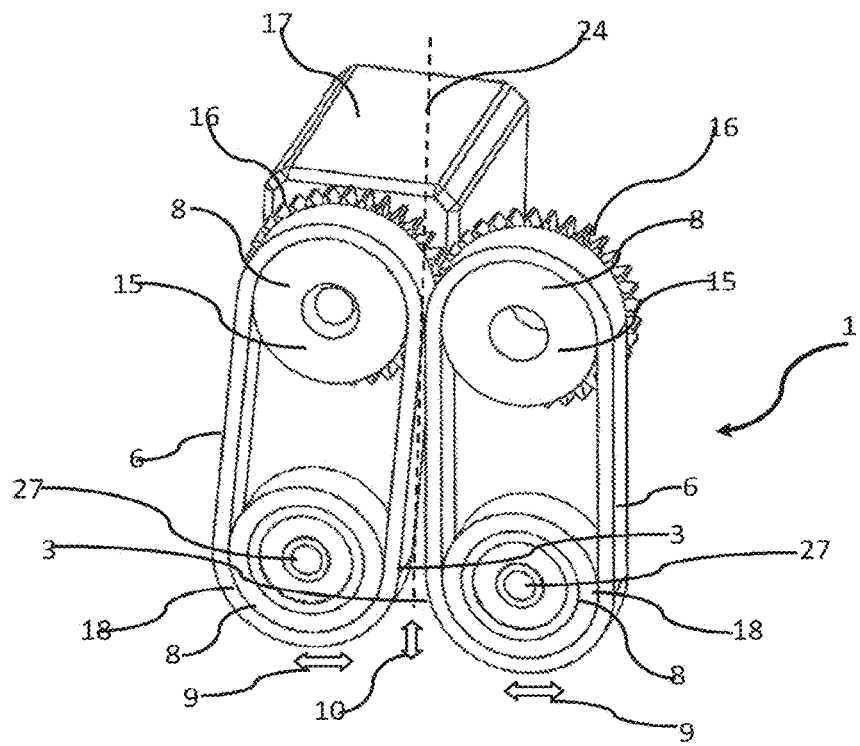
FIG. 5 is an embodiment of the gripper shown schematically in 3d view.
Figure 5A:
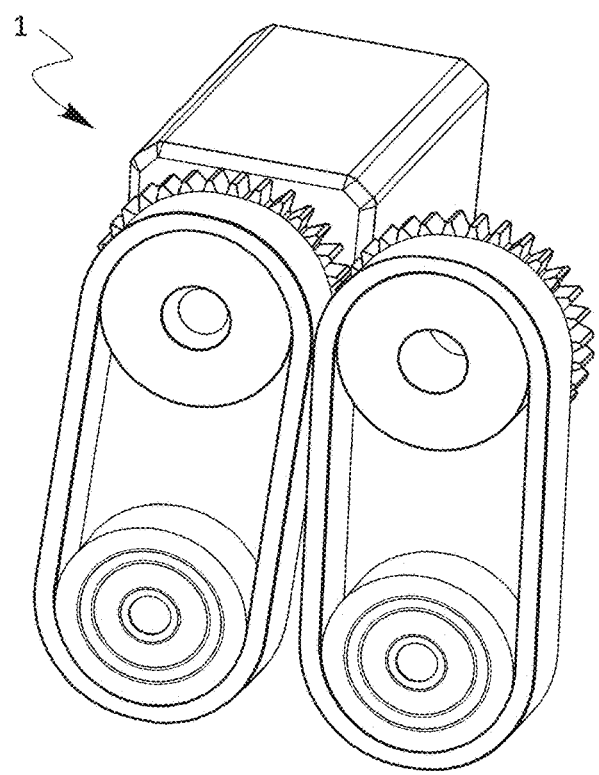
FIG. 5a is the embodiment in FIG. 5 shown in computer graphic display mode.
Figure 6:
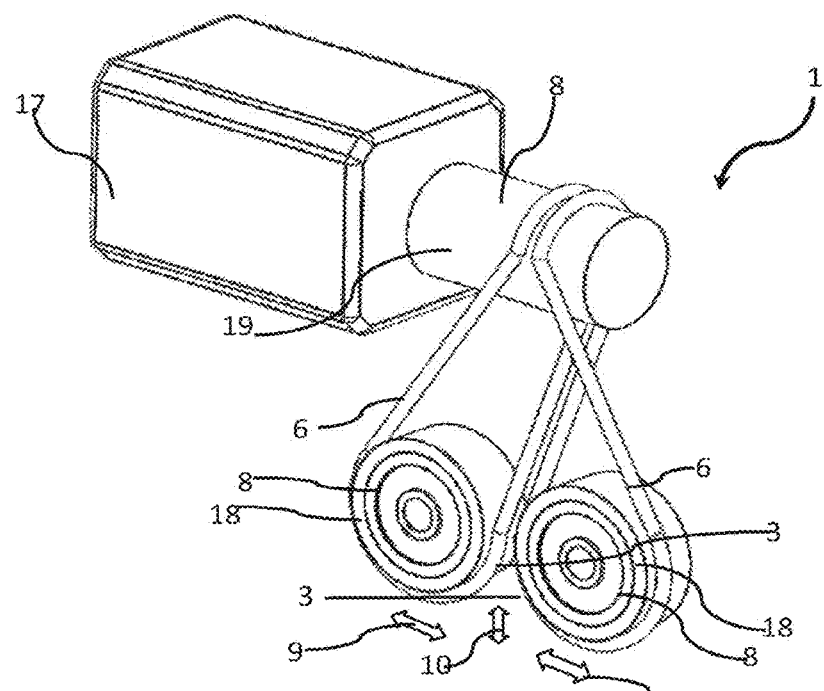
FIG. 6 is an embodiment of the gripper shown schematically in 3D.
Figure 6A:
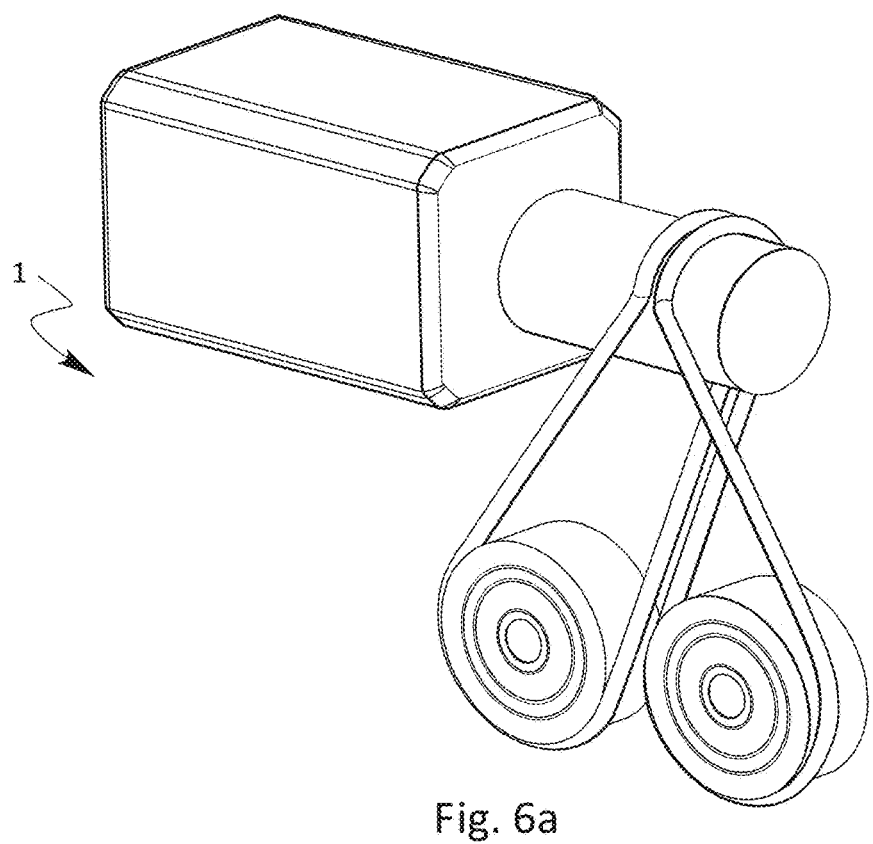
FIG. 6a is the embodiment in FIG. 6 shown in computer graphic display mode.
Figure 7:
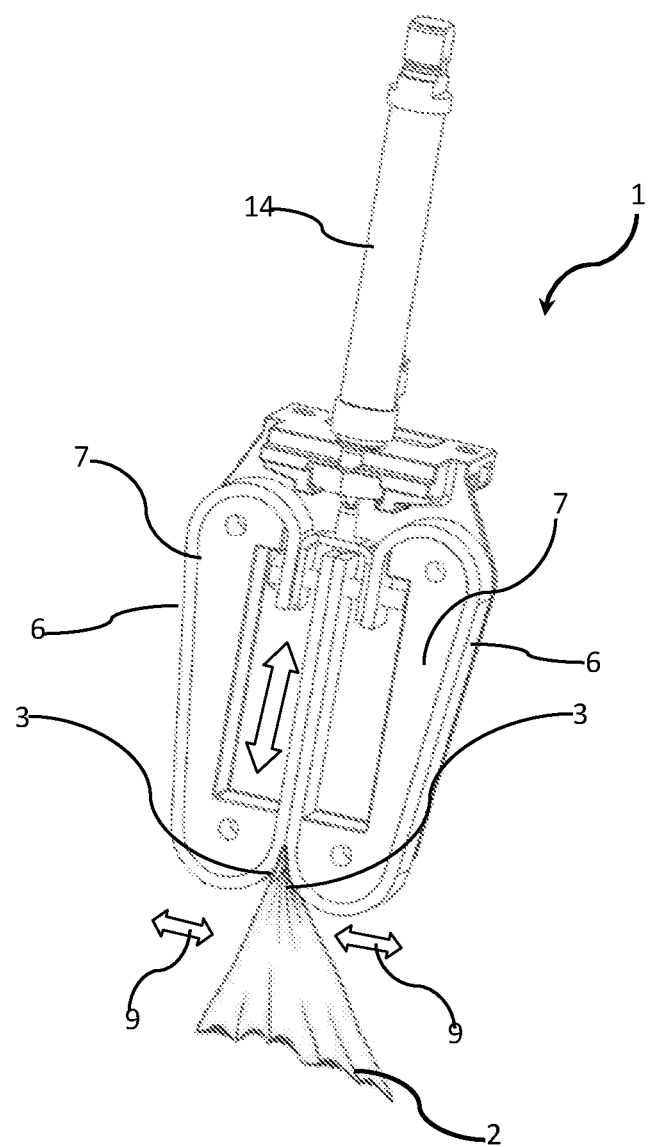
FIG. 7 shows the gripper in FIG. 2 while having gripped a piece of cloth.

Each of the embodiments in FIGS. 2, 3, 4, 5 and 6 includes opposed movable coherent surface parts 3. These surface parts 3 are movable with respect to each other. In FIGS. 2, and 3 the surface parts 3 include exteriors of conveyer belts 6 which are trailed around opposed blocks 7. In FIGS. 5 and 6 the belts 6 are trailed around wheels or rollers 8. This allows the surfaces to move towards or away from each other, as indicated with arrows 9 while moving simultaneously towards or away from the gripper and the pile of cloth, as indicated by arrow 10. Thus, a controlled nip or pinch is provided, into which a piece of cloth being in contact with the surface part 3 may be drawn by the movement of the opposed coherent surface parts 3 simultaneously towards each other and in the direction away from the piece of cloth being contacted.

In the embodiment shown in FIG. 2 the conveyer belts are drawn round opposed rounded blocks 7, which are mounted on a common frame 11. Each conveyer belt has its trailing 12 and leading edge 13 tied together to form a loop. The loops are connected to a movable member such as a plunger and cylinder pair 14, by way of which the loops may be caused to rotate slidingly around the blocks 7 causing the movements indicated by arrows 9,10. Release of a pinched piece of cloth 2 will follow by moving the plunger downward with respect to the frame 11 whereas pinching of a piece of cloth comes by moving the plunger up-wards. Hydraulic or pneumatic pressure drives the plunger up and down in the cylinder.

In the embodiment shown in FIG. 5, the conveyer belts 6 are drawn in each their own endless loop around opposed pairs of rollers or wheels 8, and here the upper two wheels 15 are interconnected by toothed wheels 16 so that they may at any time be driven in unison with the same speed but in opposite rotational directions. For drive of the toothed wheels 16 at least one of them is connected to a motor 17. By turning the motor-connected wheel counterclockwise a pinch action will be instigated by the lover part of the two conveyer belt loops between the lower two wheels 18 and by turning the motor 17 clockwise any pinched or gripped piece of cloth between the lower two wheels 18 is released.

The FIG. 2 and the FIG. 5 embodiments of the gripper will be seated at the outer end of a robotic arm as disclosed in FIG. 1, and by driving the arm in a direction towards a piece of cloth at the same rate as the rate of movement of the opposed conveyer belts 6 in the direction away from the piece of cloth at the pinching point, the conveyer belts will not be moved toward or away from the piece of cloth during a pick up or pinching action at the pinching point. By changing the drive rate of the robotic arm and the drive rate of the conveyer belts during pick up, pressure or lift may be imparted on the piece of cloth to be gripped according to what caused the most reliable gripping action. This is also the case with the other embodiments described in the following.

The conveyer belts in the embodiment shown in FIG. 6 are arranged slightly different from the belts in the FIG. 5 embodiment, as the upper two wheels are here replaced by one single roller 19. This roller 19 has a rotational axis which is perpendicular to the rotational axis direction of the lower two wheels 18 and the two conveyer belts are wound around this roller, however each turned 90 degrees with respect to the axis direction of the lower two heels 18. By turning the belts 90 degrees in opposed directions they will be driven in opposed directions at the two lower wheels 18. In this embodiment, the conveyer belts 6 may include rubbery bands with a circular cross section.

In the embodiments depicted in FIGS. 3 and 4, open ended convey belts are used. In FIG. 3 two conveyer belts 6 are arranged to pass, touching each other in a crevice 21 provided between two opposed blocks 7. Lower ends 20 of the conveyer belts 6 are fastened at fastening points 22 to each their block 7 at a part thereof facing away from the crevice 21. Between the crevice 21 and the fastening point 22 the flexible conveyer belts form symmetrical nicely rounded lobes 23 around empty space and because of the resilience of the conveyer belts 6 the two lobes 23 join to form a straight line of touch 24 outside the crevice 21. The opposed blocks may be moved up and down along the line of touch 24 by suitable moving means (not shown). Such means may move the blocks 7 and common frame 11 with respect to a fastening ground at the robotic arm where also the upper end of the two conveyer belts are fastened. Alternatively, the blocks 7 and frame 11 are fastened to the robotic arm, and the two conveyer belts are pushed from above into and out of the crevice. In either case the size of the lobes 23 will be caused to change with the relative movement between blocks 7 and conveyer belts 6 giving rise to pinch or nipping action on a possible piece of cloth residing at the meeting point 25 where the two convey belt lobes 23 meet to form the straight line of touch 24. As long as the meeting point 25 is well below the crevice 21 the conveyer belts may, due to their flexible nature, give way to the presence of the piece of cloth between them, but once the blocks are moved further downward, eventually the meting point 25 will enter the crevice 21, and here the conveyer belts 6 are restricted from moving apart from each other and a firm pinch or nip will be imparted on the piece of cloth 2. As seen in FIG. 3, the crevice has a v-shaped entrance which allows even bulky pieces of cloth to be gripped.

The embodiment of the present invention disclosed in FIG. 4 works in much the same way as the embodiment in FIG. 3 with the parallel arrangement of the conveyer belts 6 and the opposed blocks 7 and common frame 11 being the same and working in the same fashion. However, the lower ends of the conveyer belts are not fastened to the block, but are caused to spread out away from the crevice 21. The two conveyer belts 6 may not by themselves pose the resilience to assume the disclosed pose, and possibly a layer of spring metal or plastic (not shown) may be attached to the outside of the conveyer belts.

In each of the above embodiments, the member which is responsible for the gripping action undergoes a change in shape, from a curved state, when the piece of cloth is touched to a more a straight-line shape when the nipping is performed. Given the rubbery and thus highly frictional nature of the surface parts in question, this change in shape may well aid in holding on to a particular piece of cloth. Especially if the surface parts include rugged rubber-neoprene clad woven strands, the transformation from an outward bend such as around lower two wheels 18 in FIG. 5 to the straight portion between the upper and lower wheels, will cause two spaced apart surface parts of the one and same conveyer belt to approach each other, which in-itself will hold on to individual fibres in pieces of cloth such as garment elements. This effect may be enhanced in case uneven or dimpled surfaces are used on chain or conveyer belt parts. A similar effect may be experienced if the conveyer belts used comprise single interlinked elements such as in conveyer chains. Here, the angle between chain links will vary, and be largest along curved parts, which here is when the chains are trailed around the rollers, or when following curved parts of the opposed blocks 7. Such individual chain links may form coherent surfaces grace to their interlinked nature, such that a tug at one link will be felt further up and down the chain on neighboring links.

As seen from the above example embodiments of the invention at least one of the surface parts is restricted to move along a circler path, which also may be expressed as being rotated with respect to a center point 27 and/or is restricted in at least a part of its path by a guiding block 7 which forms a part of the gripper. In the embodiment shown in FIG. 5, the circular path is defined by the lower wheels 18. As also seen from FIG. 5, the lower wheels may be placed somewhat spaced apart, such that the nip along the line of touch 24 becomes prolonged and V-shaped. This allows bulkier parts to be firmly gripped and held between the surface parts 3.

Figure 8:
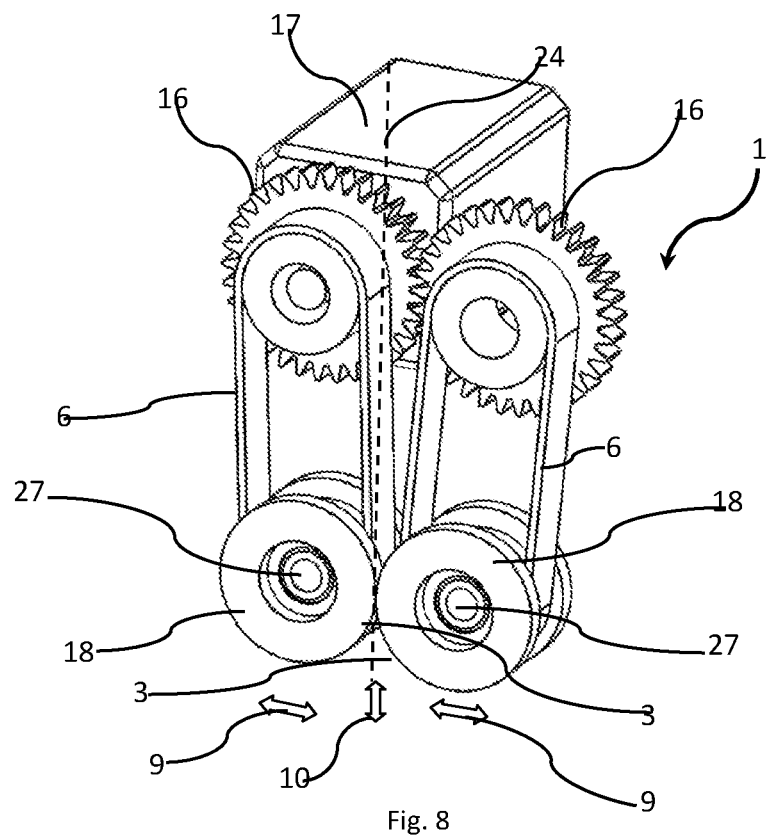
FIG. 8 is an embodiment of the gripper.
Figure 8A:
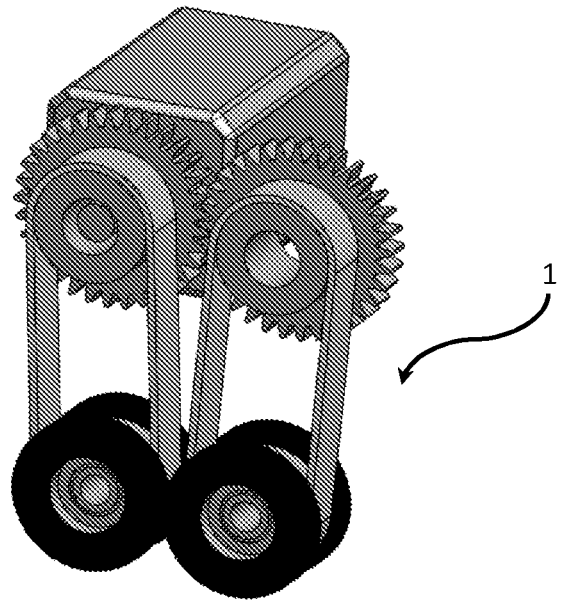
FIG. 8a is the gripper in FIG. 8 shown in computer graphic display mode.

The FIG. 5 embodiment could work by adding roller extensions axially to the lower wheels said extensions having equal, but larger diameters than the displayed wheels 18, allowing the extensions to touch or being pressed together. A gripper according to this design is disclosed in FIG. 8. Here rollers or wheels 18 form the active surfaces responsible for gripping and releasing a piece of cloth by being rotated each their way causing the line of touch to go either up or down. Thus, surfaces below the line of touch 24 move upwards and approach each other for the pick-up action, and surfaces along the line of touch move downwards while coming further apart from each other for the release action of a gripped piece of cloth. In the FIG. 8 embodiment, the lower wheels 18 touch one another and whatever is gripped will be pinched between the wheels 18 and moved upwards along the line 24. Above the wheels, the conveyer belts 6 may serve to hold on to the piece being gripped, or possibly only one conveyer belt 6 is employed leaving one of the wheels 18 as an idle wheel. Alternatively, the motor 17 is built into one of the wheels 18, in which case possibly the conveyer belts 6 may be omitted.

It shall be mentioned that even if the active surfaces in the disclosed embodiments of the gripper according to the present invention are shown as rather smooth, in reality somewhat rugged surfaces are more likely to be used, as a surface with evenly dispersed dimples or wrinkles will be more likely to reach a firm grip on a piece of cloth, even if the positioning with respect to the piece of cloth performed, prior to the gripping action, is not perfect.

In the above examples of embodiments, two opposed surface parts are responsible for the gripping action, but 3 or more opposing surface parts could be utilized.

Figure 10:
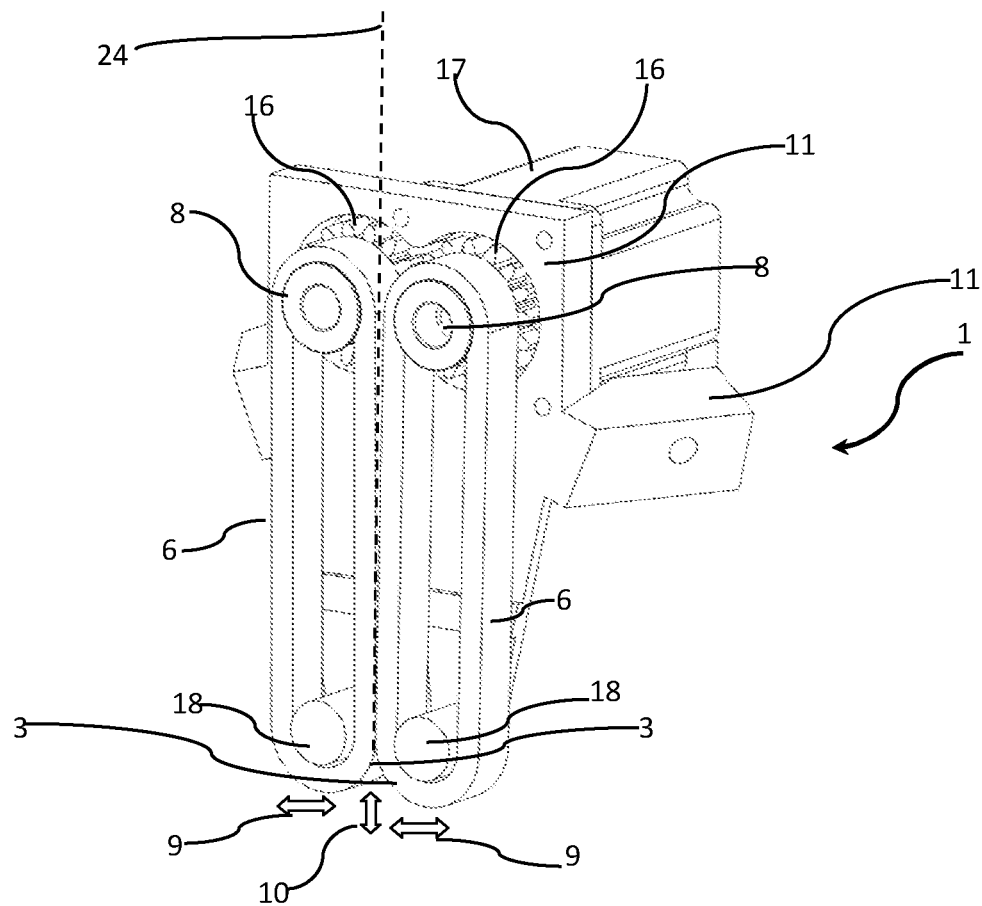
FIG. 10 is a gripper shown in 3d view.
Figure 11:
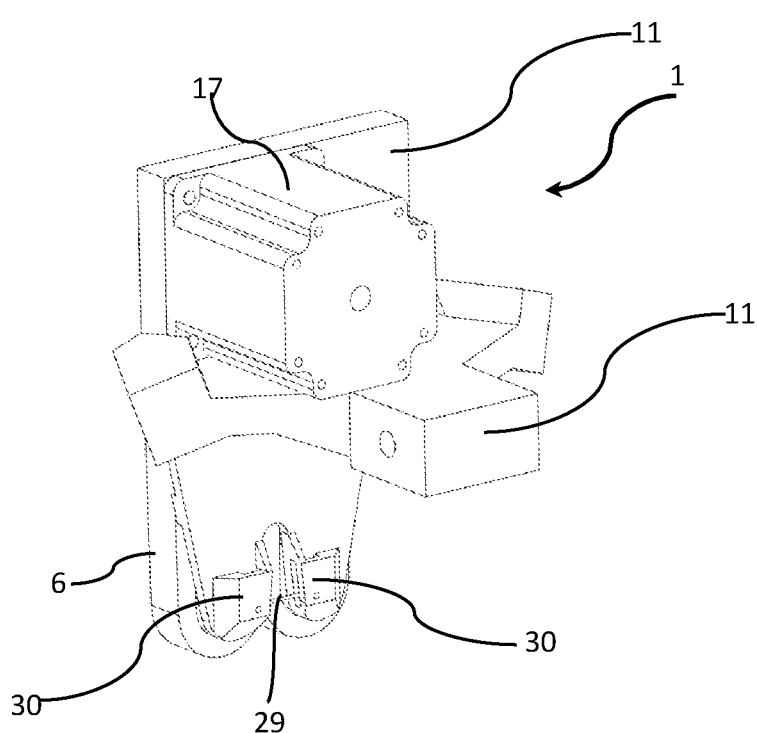
FIG. 11 is the gripper shown in FIG. 10 but seen from the opposed side.

In FIGS. 10 and 11 a further embodiment of the present invention is shown, in which the motor 17 is a stepper motor. The action of the motor 17 may then be guided by control input from an electronic device, which input will depend on one or more sensors arranged on the common frame 11 or built into the motor 17. Motors of various kinds may have this capacity, and in the preferred embodiment shown in FIGS. 10 and 11, a stepper motor is used. In FIG. 11 sensor housings 30 are indicated placed adjacent to the surface parts 3 arranged to grip a piece of cloth or garment. Inside housings 30 a sensor or sensor pair is provided. The sensor element may provide a ray of energy indicated at 29, and, thus, includes a transmitter at one of the housings and a receiver at the opposed housing. Alternatively, transmitter and receiver are provided in one housing, possibly as an element capable of both transmitting and receiving a ray of energy. Whenever a piece of garment is advanced into the nipping area between the surface parts 3, the ray of energy 29 will be interrupted and/or reflected which is sensed at the sensor or sensor pair, and a signal is provided to the effect that the advancement of the surfaces 3 is halted as the motor 17 is stopped. The energy used for sensing the presence of a piece of garment between the surfaces 3 may be electromagnetic energy such as light or radar energy, or sound waves, preferably in in the ultra sound range may be utilized. Also, particle energy such as known in smoke sensors could be used to detect the presence of a piece of garment.

If a sensor is built into the motor it could be in the form of an electronic gauge, which monitors the moment transmitted from the motor and onto the toothed wheels and thus the pull in the surface parts 3. Here the presence of a piece of cloth in the nipping area will cause increased pull in the surface parts, which will increase the moment imparted on the toothed wheels by the stepper motor.

Alternative methods of sensing the presence of a piece of garment are such as pressure sensors built into the lower wheel pair 18, or a strain gauge built into the common frame 11. The presence of a piece of garment in the nipping area will cause the surfaces 3 to be pressured away from each other, causing stress in the common frame and increase pressure on the bearings of the wheel pair 18, both of which are detectable conditions.

Also, a distance sensor which measures the distance from above and to any object adjacent to the nip between the surfaces 3 may be used to sense if something has been picked up, or a mechanical switch may be used, which is imparted and interrupted or closed when a piece of garment enters into the area between the lover two wheels 18 or the nipping area between the surfaces 3.

When a sensor is combined with the gripper and used to control the gripping actions, a higher hit rate is achieved in terms of assuring that only a single piece of garment gripped at each attempt, which is a highly desirable outcome.

Figure 12:
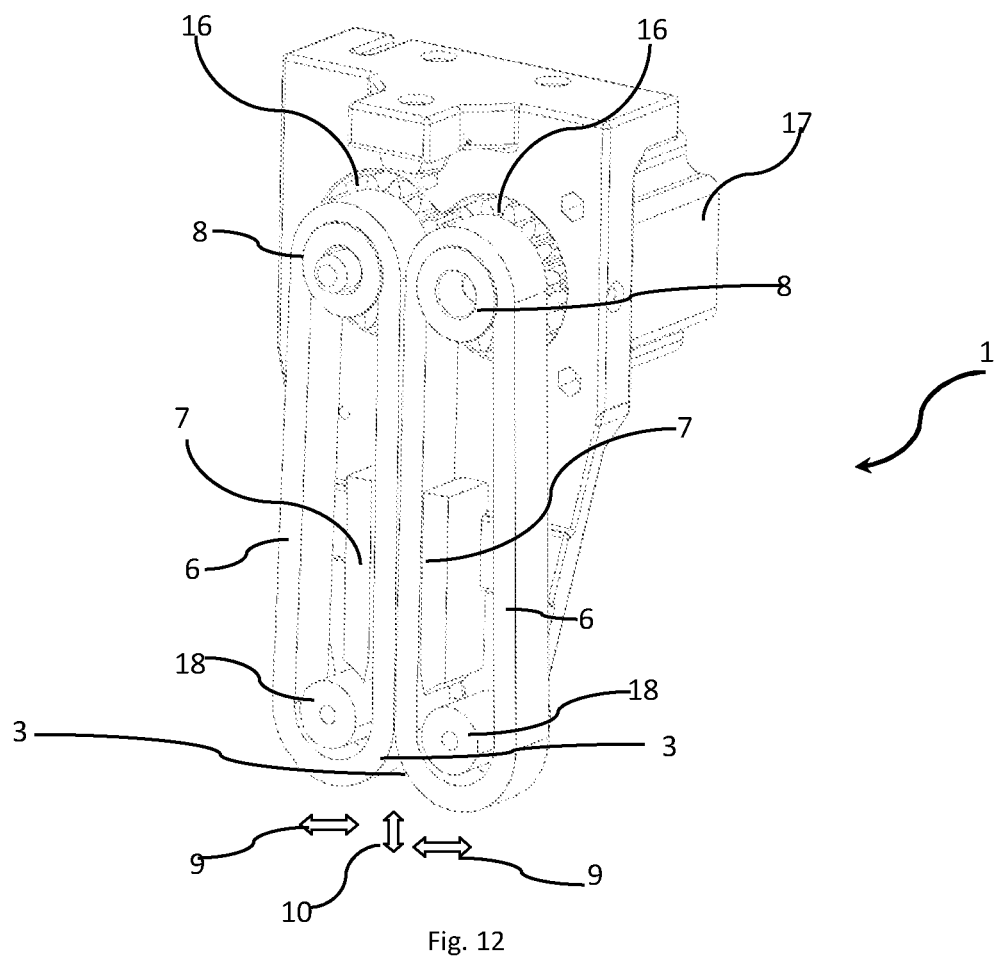
FIG. 12 is a further embodiment of the gripper shown in FIG. 10.

The gripper shown in FIG. 12 shows the opposed blocks 7 provided at each side of the conveyer belts 6 in the area where cloth may be nipped and pinched between the surfaces 3 of the belts 6. The blocks 7 ensure, that a pinching force is not dependent alone on high tension of the belts 6, but is also given by pressure build up between the blocks 7 and the surfaces 3 once an item 2, as displayed in FIG. 1, is advanced into the area between the blocks 7.

In the FIGS. 10 and 11 embodiment the blocks 7 are also part of the construction, however, to keep the drawing simple, they are not displayed.

In the further embodiment disclosed in FIGS. 13A-B the gripper 1 includes an extra set of wheels named middle wheels 31, which are located between the upper 8 and lower 18 wheel pairs. The extra set of wheels 31 has axis points which are slightly off set towards each other with respect to the lines between the rotation axis of upper 8 and lower wheels 18. The portion of the belts 6 between the middle wheels 31 and the lower wheels 18 thus will form a V-shape 32 which will help for cloth to be nipped between the conveyer belts 6. As shown in FIG. 13B, the gripper 1 is shown with removable covers in place, and in slightly reduced size.

Figure 15:
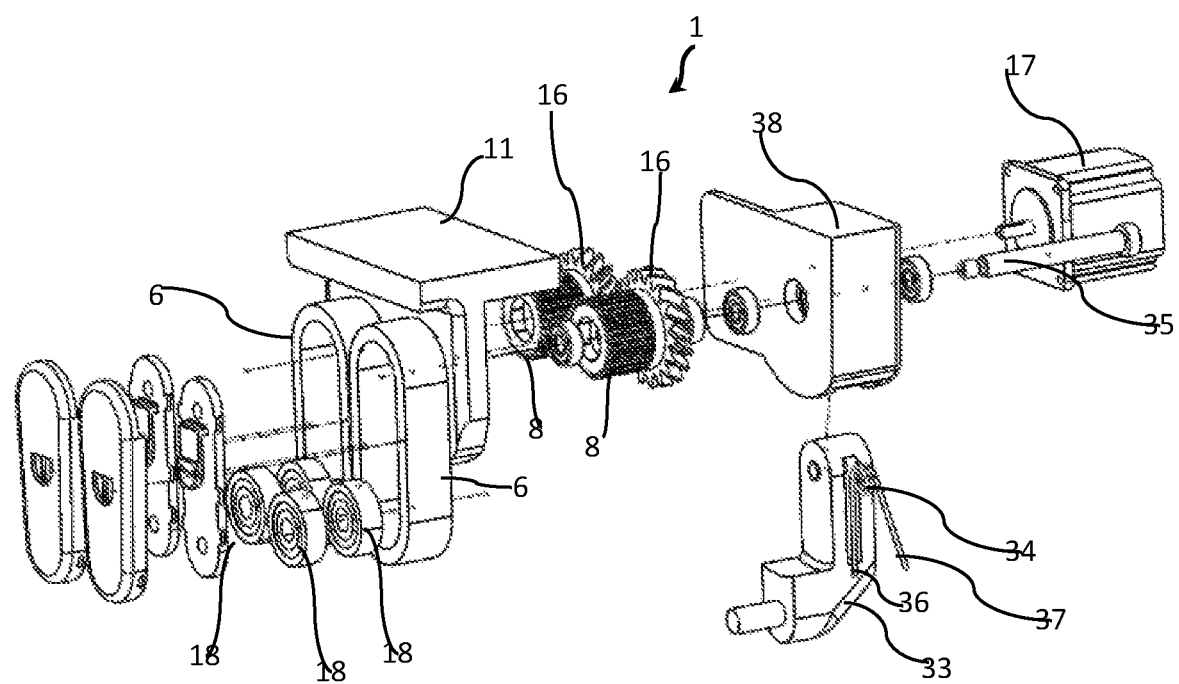

In the embodiment of the gripper 1 disclosed in FIGS. 14A-C, one of the wheel pair 8,18 is hingedly connected to the frame member 11 (shown in FIG. 14B), such that these two wheels may pivot together with the rotation axis of the upper wheel 8 as the pivot point. The motion is indicated by pivot arrow 39 in FIGS. 14A-C. This construction requires a slight change in that the lower pivotable wheel 18 needs a frame member of its own, in order to pivot with respect to frame member 11. This member is named pivot member 33 and is also seen in FIG. 15.

A torsion spring 34 is inserted on pivot pin 35 such that the when the torsion spring 34 and pivot member 33 are both mounted to the pivot pin 35, the torsion spring may urge the pivot member with the mounted lover wheels 18 towards the opposed wheel pair secured in frame member 11. In doing this the torsion spring has two extending arms 36, 37 as seen in FIG. 15, which will be urged towards each other in the assembly, as the pivot member 33 is inserted in additional frame member 38.

In FIGS. 14A-C, the extending arm 37 is seen extending out of the apparatus, as here the additional frame member 38 is not included in the drawing and the torsion spring, thus, is displayed in its unbent state.

As seen here, this embodiment works without the previously mentioned pair of middle wheels 31 or opposed blocks 7, as the workings of the torsion spring ensures the pressure between the belts 6.

REFERENCE NUMBERS

1. Gripper
2. Piece of cloth
3. Surface parts
4. Pile
5. Conveyer mechanism
6. Conveyer belts
7. Opposed blocks
8. Wheels
9. Arrow
10. Arrow
11. Common frame
12. Trailing edge
13. Leading edge
14. plunger and cylinder pair
15. upper two wheels
16. toothed wheels
17. Motor
18. Lower two wheels
19. One single roller
20. Lower ends
21. crevice
22. Fastening point
23. Lobes
24. straight lines of touch
25. meeting point
26. robotic arm
27. Center point.
28. Two arms
29. Ray of wave energy
30. Housing for sensor pair
31. Middle pair of wheels
32. V-shape
33. Pivot member
34. Torsion spring
35. Pivot pin
36. Extending arm
37. Extending arm
38. Additional frame member
39. Pivot arrow

The invention claimed is:

1. A gripper adapted to grip, hold and release a piece of cloth, the gripper comprising:
    a first frame member;
    a first conveyor belt attached to the first frame member, the first conveyor belt comprising:
        a first wheel comprising a first toothed wheel with a first set of teeth and which rotates about a first axis of rotation;
        a second wheel; and
        a first conveyor belt loop trailed around the first wheel and the second wheel;
    a second conveyor belt attached to the first frame member, the second conveyor belt comprising:
        a third wheel comprising a second toothed wheel with a second set of teeth that engage with the first set of teeth and which rotates about a second axis of rotation,
        a fourth wheel; and
        a second conveyor belt loop trailed around the third wheel and the fourth wheel, wherein the first conveyor belt loop is opposed to the second conveyor belt loop and a nip into which a piece of cloth is drawn is defined between the second conveyor loop and the first conveyor loop;
    a motor that rotates the first toothed wheel clockwise or counter clockwise about the first axis of rotation;
    a second frame member attached to the second wheel or the fourth wheel, wherein the second frame member is pivotally mounted for turning relative to the first frame member about either the first axis of rotation if attached to the second wheel or the second axis of rotation if attached to the fourth wheel;
    a spring biasing the second frame member to a first position wherein the second wheel and the fourth wheel are near each other to allow for holding a piece of cloth.

2. The gripper according to claim 1, further comprising a robotic arm that moves the first conveyor belt and the second conveyor belt around in a 3-dimensional space, wherein the first conveyor belt and the second conveyor belt can be moved relative to one another away from one another for releasing the cloth.

3. The gripper according to claim 1, wherein a first surface of the first conveyor belt loop faces a second surface of the second conveyor belt loop, and wherein a first distance between portions of the first surface and the second surface at the first wheel and the third wheel, respectively, is constant regardless of how much the second frame member pivots while a second distance between portions of the first surface and the second surface at the second wheel and the fourth wheel, respectively, varies depending how much the second frame member pivots.

4. The gripper according to claim 1, wherein a first distance between the first wheel and the second wheel is constant and a second distance between the third wheel and the fourth wheel is constant regardless of how much the second frame member pivots.

* * * * *